United States Patent
Stuemky

[11] 3,779,038
[45] Dec. 18, 1973

[54] CENTERING DEVICE FOR FLEXIBLE SHAFT COUPLINGS

[75] Inventor: Robert E. Stuemky, Elizabeth, Colo.

[73] Assignee: The Gates Rubber Company, Denver, Colo.

[22] Filed: Apr. 19, 1972

[21] Appl. No.: 245,419

[52] U.S. Cl. .............. 64/11 B, 64/17 R, 64/21, 64/27 NM, 64/13
[51] Int. Cl. .............................................. F16d 3/28
[58] Field of Search ............. 64/11 B, 15 R, 15 C, 64/17 R, 8, 11 R, 21, 27 NM, 13

[56] References Cited
UNITED STATES PATENTS

| 2,107,689 | 2/1938 | Bugatti | 64/13 |
| 2,421,134 | 5/1947 | Venditty | 64/27 NM |
| 2,953,001 | 9/1960 | Hufstader | 64/17 R |
| 2,953,910 | 9/1960 | Hufstader | 64/17 R |
| 2,245,764 | 6/1941 | Dome et al. | 64/15 C |
| 2,780,080 | 2/1957 | Cork | 64/27 |
| 3,393,536 | 7/1968 | Daur | 64/13 |

FOREIGN PATENTS OR APPLICATIONS

| 1,014,347 | 6/1952 | France | 64/11 R |

Primary Examiner—Charles J. Myhre
Assistant Examiner—Randall Heald
Attorney—Raymond Fink et al.

[57] ABSTRACT

A centering device for flexible shaft couplings that includes a tubular member or alternately a hub having a socket; an elastomeric ring disposed in the tubular member or socket; and a stud extending into the socket or tubular member, and through the elastomeric ring to be radially supported thereby.

12 Claims, 3 Drawing Figures

3,779,038

CENTERING DEVICE FOR FLEXIBLE SHAFT COUPLINGS

BACKGROUND OF THE INVENTION

The invention relates to flexible shaft couplings but more particularly the invention relates to centering devices which define a positive center of rotation while permitting angular misalignment with a flexible coupling between two coupled shafts.

Centering devices are used in flexible couplings to define a common positive center of rotation for two angularly misaligned shafts, and to minimize shaft runout and balance problems. A centering device is required where the flexing elements of a coupling do not per se define a kinematic center. For example, a centering device is normally required in a flexible spring-type coupling, or a double cardon coupling. Typically, the centering device includes a ball and socket arrangement which permits unlimited angular movement within the limits of a cone.

While the prior art centering devices are adequate in performance, they are complicated in assembly and normally require inclusion of a separate sealing arrangement for the purpose of retaining a lubricant.

SUMMARY OF THE INVENTION

The invention includes a hub having a socket, or alternately a tubular member, into which is inserted an elastomeric ring. A stud or cylindrically shaped member extends into the socket and through the ring. The stud is radially supported by the ring. Angular displacement of the stud in relation to the hub is achieved by distorting the elastomeric ring. Optionally, the elastomeric ring doubles as a lubricant seal.

Accordingly, it is an object of the invention to provide an inexpensive centering device for flexible couplings that are simple and easy to assemble and which may double as a lubricant seal.

TECHNICAL DESCRIPTION

Figure 1:
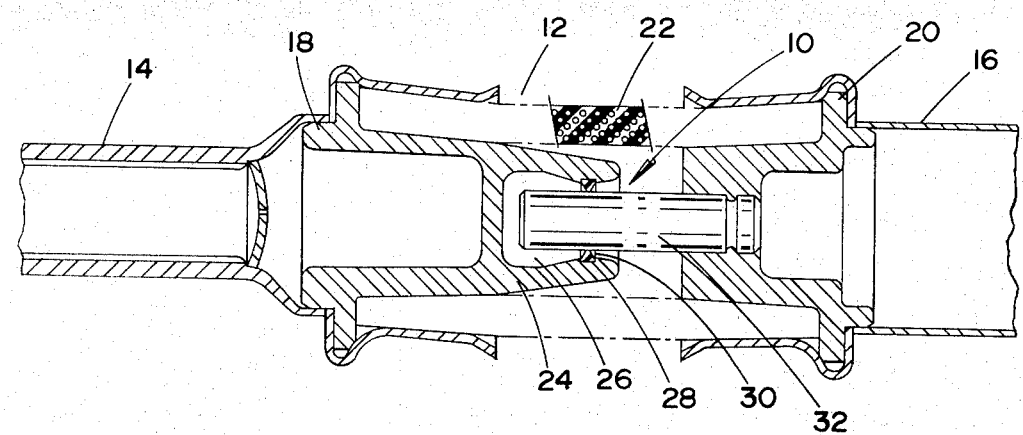
FIG. 1 is an axial cutaway view of a flexible coupling incoprorating a centering device of the invention.

Referring to FIG. 1, a centering device 10 is provided for a flexible coupling member 12 in accordance with the invention. The flexible coupling 12 is connected to and disposed generally axially between two shafts 14, 16 of any desired configuration. The coupling may be connected to the shafts by any convenient fastening or welding technique. The shafts are connected to end portions 18, 20 of the coupling. A flexible element for transmitting torque extends between the end portions. Although not required, a flexible element 22 in accordance with U.S. Pat. No. 3,628,352 is preferably used. Examples of other flexible elements and end portions include those as represented in U.S. Pat. Nos. 3,347,061 and 3,621,674.

A hub 24 having a bulbous socket 26 formed therein extends from or is connected to one end portion 18. An annular groove 28 is formed in the socket to define a means for retaining an elastomeric ring 30. Other means may be used for retaining the elastomeric ring but the annular groove is preferred because of its simplicity. The elastomeric ring 30 may have any desired shape to complement the groove 28 or other retaining means, and the ring 30 extends radially outward of the socket. That portion of the ring extending radially inward from the groove 28 may also be of any desired shape. For example, oval, triangular, rectangular cross sections, or combinations thereof may be used.

Various elastomeric materials may be used for the ring 30 such as plastic, rubber or polyurethane. The material may not be brittle but preferably, the material is semi-hard having a durometer reading of upper A scale shore hardness. More preferably, a material is preferred that has at least a 90 durometer A scale shore hardness at 77° fahrenheit. An example of such a material is a polyurethane sold under the trade name "Desogrin" by Desogrin Industries.

A stud 32 or cylindrically shaped member, extends axially from the other end portion 20, through the elastomeric ring 30 and into the socket 26. The stud diameter is slightly larger than the internal diameter of the ring 30 which results in the ring being distorted as the stud is inserted. The ring 30 provides radial support to the stud. Optionally but more preferably, a lubricant is disposed in the socket before the stud 32 is inserted. The lubricant is constantly supplied to the ring, and the ring 30 doubles as a seal to retain the lubricant in the socket 26.

Here, the advantages of assembling the centering device 10 should be noted. All that is required is that the ring 30 be inserted in the groove 28, lubricant disposed in the socket 26, and the stud 32 inserted through the ring 30. There are no interlocking parts such as normally used in a ball and socket centering device where pre assembly of the device is normally required before assembly of the end portions and flexible element may take place. In accordance with the invention, assembly of the end portions, centering device, and flexible element may take place simultaneously. The centering device is merely assembled as a blind insert.

When a flexible coupling 12 using the centering device 10 of the invention is in use, the end portions 18, 20 of the coupling are connected to separate rotatable shafts 14, 16. The shafts are axially free to angularly displace in relation to each other which distorts the flexible element 22. Simultaneously, the hub 24 is offset angularly in relation to the stud 32 as the hub and stud are rigidly connected to their respective end portions 18, 20. The elastomeric ring 30 is distorted to accomodate the relative movement between the hub 24 and stud 32. The elastomeric ring 30 continues to radially support the stud 32 when distorting to thereby define a positive center of rotation that is common to both shafts 14, 16. The bulbous contour of the socket 26 accomodates the wobbling end of the stud during angular misalignment.

ADDITIONAL SPECIES

Figure 2:
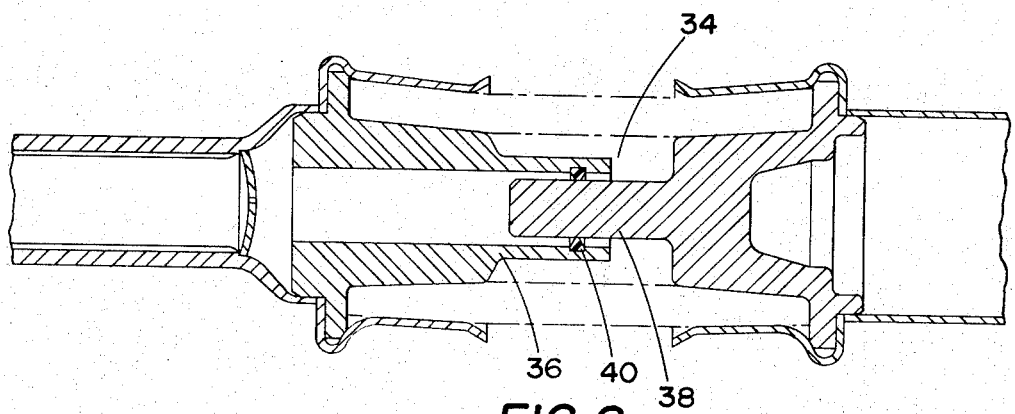
FIG. 2 is a view similar to FIG. 1 showing an alternate form of the invention.

Referring to FIG. 2, a coupling centering device 34 is depicted that is similar to that of FIG. 1. A tubular member 36 replaces the hub and a simple cylindrical member 38 replaces the stud as an alternate form of construction. An elastomeric ring 40 of another cross section is also used. The centering device 34 operates in a manner as previously described.

Figure 3:
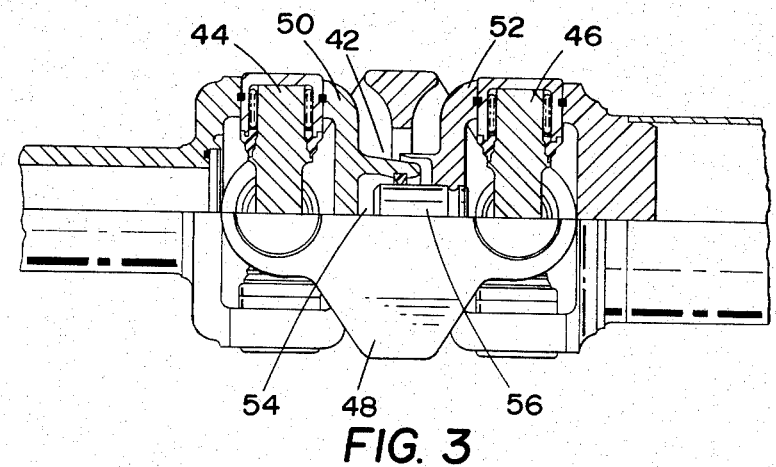
FIG. 3 is a view similar to FIG. 1 showing another application of the invention.

The centering device may also be used in flexible couplings of the articulating type where a positive kinematic center is not defined. For example, the centering device 42 may be used in a double cardon joint such as shown in FIG. 3. The first 44 and second 46 cross members are joined together with a coupling yoke 48 to define a flexible element. A centering device is required to force the joint flexing to be split equally between the first and second cross members. A centering device 42 in accordance with the invention is disposed between yokes 50, 52 of the first and second cross members 44, 46. One yoke 50 defines a socket 54 while the other yoke defines a stud 56. The centering device operates in a manner similar to that as explained in reference to FIG. 1.

The foregoing detailed description is made for purpose of illustration only and it is not intended to limit the scope of the invention which is to be determined from the appended claims.

What is claimed is:

1. A centering device comprising:
   a tubularly shaped member;
   a single element elastomeric ring disposed and arranged radially within the tubularly shaped member said ring having a portion that extends radially inward and is capable of being axially deflected, the radially inward portion having two generally axially convergent side portions;
   a cylindrically shaped member extending into the tubularly shaped member and through the ring, a portion of the cylindrical member radially positioned at an interface by the elastomeric ring, the interface between the cylindrical member and elastomeric ring defining a limited surface of contact; and
   means for retaining the elastomeric ring between the tubularly shaped member and the cylindrically shaped member;
   whereby the limited surface of contact in cooperation with the axially deflectable radial inward portion and generally convergent side portions of the ring allow large angular misalignment as the tubularly shaped member and cylindrical member are angularly misaligned.

2. A centering device as set forth in claim 1 and further including a lubricant disposed in said tubular member.

3. A centering device as set forth in claim 2 wherein said elastomeric ring further defines a seal between said tubularly shaped and said stud for retaining lubricant in the socket.

4. A centering device that allows angular misalignment between juxtaposed ends of two rotatable shafts comprising:
   a member mounted to the end of one shaft, said member defining an axially extending generally tubularly shaped member;
   a single element elastomeric ring disposed in the tubularly shaped member said ring having a portion that extends radially inward and is capable of being axially deflected, the radially inward portion having two generally axially convergent side portions;
   a stud mounted to the end of and axially aligned with the other shaft, said stud extending through said ring and into said tubular element, a portion of said stud radially positioned at an interface by said ring, the interface between the stud and elastomeric ring defining a limited surface of contact; and
   means for retaining said ring in position between the socket and said stud;
   whereby the limited surface of contact in cooperation with the axially deflectable radial inward portion and generally convergent side portions of the ring allow angular misalignment as the tubularly shaped member and stud are angularly misaligned.

5. A centering device as set forth in claim 4 and further including a lubricant disposed in said tubularly shaped member.

6. A centering device as set forth in claim 5 wherein said elastomeric ring further defines a seal between said socket and said stud for retaining lubricant in the tubularly shaped member.

7. A centering device comprising:
   a hub having an axial socket;
   a single element elastomeric ring disposed radially in the socket said ring having a portion that extends radially inward and is capable of being axially deflected, the radially inward portion having two generally axial convergent side portions;
   a stud extending generally axially through said ring and into the socket, a portion of said stud radially positioned at an interface by said ring, the interface between the stud and elastomeric ring defining a limited surface of contact; and
   means for retaining said ring in position between the socket and said stud;
   whereby the limited surface of contact in cooperation with the axially deflectable radial inward portion and generally convergent side portions of the ring allow large angular misalignment as the hub and stud are angularly misaligned.

8. A centering device as set forth in claim 7 and further including a lubricant disposed in said socket.

9. A centering device as set forth in claim 8 wherein said elastomeric ring further defines a seal between said socket and said stud for retaining lubricant in the socket.

10. In a flexible coupling with first means and second means for adapting the coupling between two rotatable shafts, the improvement which comprises:
    means for allowing angular misalignment between the shafts, said means including:
       a hub extending axially from one adapting means, said hub having an axial socket;
       a single element elastomeric ring disposed and retained radially within the socket, said ring having a portion that extends radially inward and is capable of being axially deflected, the radially inward portion having two generally axially convergent side portions:
    a stud extending axially from the other adapting means, through said ring and into the socket, a portion of said stud radially positioned at an interface by said ring, the interface between the stud and elastomeric ring defining a limited surface of contact;
    whereby the limited surface of contact in cooperation with the axially deflectable radial inward portion and generally convergent side portions of the ring allow large angular misalignment as the first and second means are angularly misaligned.

11. A centering device as set forth in claim 10 and further including a lubricant disposed in said socket.

12. A centering device as set forth in claim 11 wherein said elastomeric ring further defines a seal between said socket and said stud for retaining lubricant in the socket.

* * * * *